US012596438B2

(12) United States Patent
Holz et al.

(10) Patent No.: US 12,596,438 B2
(45) Date of Patent: Apr. 7, 2026

(54) WEARABLE DEVICE FOR FINGER IDENTIFICATION UPON CONTACT ON A SURFACE

(71) Applicant: ETH Zürich, Zürich (CH)

(72) Inventors: Christian Holz, Zürich (CH); Manuel Meier, Wettingen (CH); Paul Streli, Zürich (CH); Andreas Fender, Zürich (CH)

(73) Assignee: ETH ZURICH, Zurich (CH)

( * ) Notice: Subject to any disclaimer, the term of this patent is extended or adjusted under 35 U.S.C. 154(b) by 165 days.

(21) Appl. No.: 18/281,234

(22) PCT Filed: Mar. 3, 2022

(86) PCT No.: PCT/EP2022/055344
§ 371 (c)(1),
(2) Date: Sep. 8, 2023

(87) PCT Pub. No.: WO2022/189238
PCT Pub. Date: Sep. 15, 2022

(65) Prior Publication Data
US 2024/0152212 A1 May 9, 2024

(30) Foreign Application Priority Data

Mar. 10, 2021 (EP) ..................................... 21161857

(51) Int. Cl.
*G06F 3/01* (2006.01)
*G06F 1/16* (2006.01)
*G06F 3/042* (2006.01)

(52) U.S. Cl.
CPC .............. *G06F 3/017* (2013.01); *G06F 1/163* (2013.01); *G06F 3/014* (2013.01); *G06F 3/0426* (2013.01)

(58) Field of Classification Search
CPC .......... G06F 3/017; G06F 1/163; G06F 3/014; G06F 3/0426; G06F 3/011; G06F 3/015
See application file for complete search history.

(56) References Cited

U.S. PATENT DOCUMENTS

| | | | | |
|---|---|---|---|---|
| 11,281,301 B2 * | 3/2022 | Belfiori | ................. | G06V 10/17 |
| 11,287,885 B1 * | 3/2022 | Kienzle | .................. | G06F 3/016 |
| 11,493,993 B2 * | 11/2022 | Rubin | ................... | G06F 3/0481 |
| 2019/0011994 A1 | 1/2019 | Belfiori | | |
| 2021/0064132 A1 | 3/2021 | Rubin et al. | | |

FOREIGN PATENT DOCUMENTS

WO      2013135299 A1     9/2013

OTHER PUBLICATIONS

International Search Report and Written Opinion for PCT/EP2022/055344 mailed Aug. 17, 2022, 13 pages.

* cited by examiner

*Primary Examiner* — Phuong H Nguyen
(74) *Attorney, Agent, or Firm* — Blank Rome LLP

(57) ABSTRACT

The present invention relates to wearable device (1) adapted to detect contacts of fingers (F) on a surface (S), and to identify the responsible finger. It comprises move sensors adapted to collect the vibrations resulting from the contact of the fingers on a surface. It comprises a memory comprising reference vibration profiles (T), corresponding to the impact of at least one finger (F) of a user (U) to a surface (S). A computing unit (32) is configured allows to identify the finger responsible for the impact sensed by the move sensors (10, 10a, 10b). The invention further relates to a manufacturing process of such a device and to a method of sensing the contact of a finger on a surface.

15 Claims, 5 Drawing Sheets

WEARABLE DEVICE FOR FINGER IDENTIFICATION UPON CONTACT ON A SURFACE

RELATED APPLICATIONS

Figure 1:
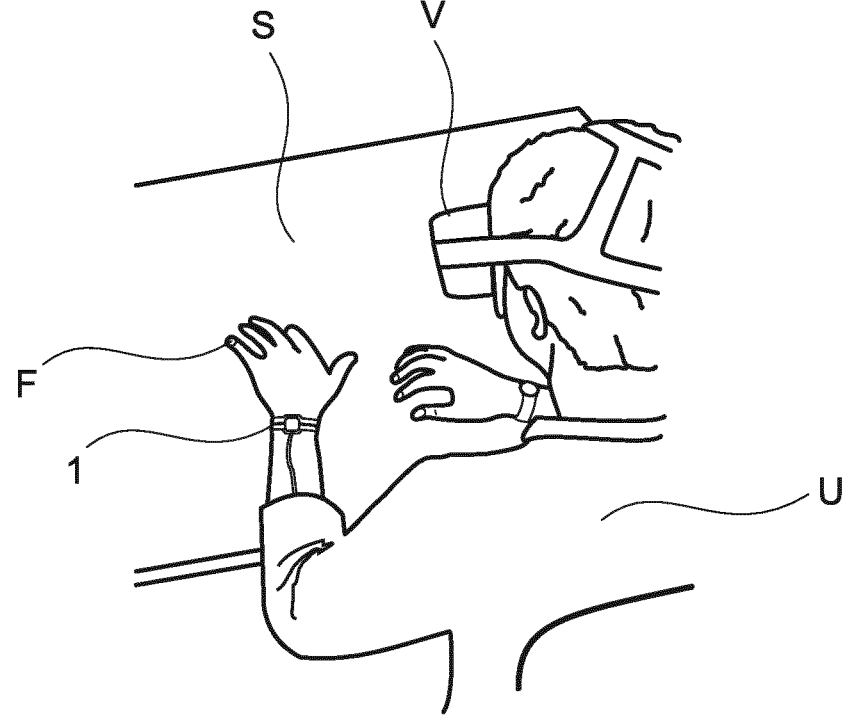

This application is a national phase of PCT/EP2022/055344, filed on Mar. 3, 2022, which claims priority to European Patent Application No. EP 21161857.4, filed on Mar. 10, 2021. The contents of these applications are hereby incorporated by reference in their entirety.

TECHNICAL DOMAIN

The present invention concerns a wearable device adapted to determine the contact of a finger with a surface. It allows in particular to identify a specific finger establishing the contact with a surface. The wearable device of the present invention can be used in combination with optical arrangements involved in virtual reality or augmented reality equipment. The present invention also relates to a method of precisely determining contacts of the fingers on a surface so as to eliminate false input commands.

RELATED ART

Wearable sensors are commonly used to identify movements of the body. For example, accelerometers are known to identify ample movements of members or body of a user. The movements of a user can thus be recognized and combined with a virtual environment. In air movements find applications in various activities involving virtual environments, including manual training, remote assistance and gaming, in various technical fields such as medical and surgical fields, manufacturing field and so on. For a precise interaction with a virtual environment, in air movements may lack acuity. In addition, due to the lack of reliable haptic effects, the user often remains uncertain of his movements. This obliges the user to concentrate on his movements which would otherwise be natural. In case of prolonged activity, in air movements cause fatigue, which is detrimental to the efficacity of the operations.

Interactions with real surfaces thus appear more comfortable and allow prolonged activity. Precise interaction with a virtual environment is easier and more accurate. In particular, when several keys or other input commands need to be selected and activated, the user benefits from the physical feedback from the surfaces, which provides a better certainty of his movements. This is particularly true, for example, when activating keys of a virtual keyboard. Repetitive and fast movements are accomplished, all having a limited amplitude. The usual wearable sensors, adapted to determine ample movements are not convenient for such applications. In this context, each finger needs to be equipped with at least one motion sensor, which obliges the user to wear a cumbersome equipment such as gloves or any other similar device.

Optical sensors involved to determine the interaction of a user with a virtual environment are usually accurate for ample movements. Such optical sensors are usually cameras, which can be part of a headset or externally mounted. In air moves are thus easily detected and analysed. However, when considering the contact to a real surface, and in particular, the multiple and fast contacts of the fingers with a real surface, the optical sensors suffer from a lack of accuracy, especially for distinguishing a finger touching and a finger hovering just above the surface. Multiple cameras arranged abroad the user at different positions limit the misinterpretation of the finger movements since this allows to clearly visualise each of the fingers. However, such an arrangement requires a space specifically dedicated to such particular activity, comprising several cameras. It is thus not adapted, for example, for nomad activities and lacks flexibility. For configurations with only one camera or a limited number of cameras, the detection of the contact of the fingers on the surface becomes challenging. This is the case for example when the user wears a headset or virtual glasses, comprising a limited number of cameras, if not only one. In addition, the time necessary for the image processing increases the latency. A solution involving exclusively an optical approach thus appears not suitable for such application, wherein fast and repetitive short movements need to be identified. At least, an expensive installation, with performant and rapid image treatment would be required.

Efforts have been made to combine the known optical solutions with detection of contact of the fingers on a real surface. For example, piezoelectrical transducers can be placed on the fingertips or knuckles to detect the contact and identify the corresponding finger. As mentioned above, this kind of solutions still necessitate to equip the fingers or the hand of the user with sensors. An approach based on the detection of myographic signals have been investigated. Examples using electromyography (EMG), using sensors attached higher up on the forearm, have been provided. While such a solution allows to keep the fingers and the hand free of sensors, it appears to have a limited accuracy.

There is thus currently a need for improved solutions regarding the sensing of the finger contact on a real surface in virtual environments.

SHORT DISCLOSURE OF THE INVENTION

An aim of the present invention is the provision of a wearable device that overcomes the shortcomings and limitations of the state of the art. It is in particular an aim of the present disclosure to provide a wearable device allowing to reliably detect the contact of the fingers on a surface and identifying the concerned finger, while keeping the fingers and the hand free of sensors.

Another aim of the present disclosure is to provide a wearable device adapted to detect fast and repetitive movements, more particularly, short movements, which comprise a contact to a surface. The aim is more particularly to provide a contact detection means having a low latency. The aim is more preferably to provide a contact detection means having a latency as low as 50 ms, or lower, such as around 30 ms or around 10 ms or lower. It is in addition an aim to detect and identify the contact of a finger on a surface, and identify the corresponding finger, with an accuracy of more than 95%, or more than 98% or close to 99% or 100%.

It is a further aim of the present disclosure to provide a wearable device adapted to detect and identify a finger contact on a surface, which is easily adaptable to different users.

Another aim of the invention is to provide a virtual arrangement, comprising projection means adapted to create a virtual environment, and optical detection means adapted to determine the movements of a user, and further comprising a contact detection means adapted to identify and recognize the contact of a finger on a surface, while keeping the fingers and the hands of the user free of sensors. It is in particular an aim to provide a virtual arrangement, which is adapted for nomad activities, meaning that no extra sensing devices should be installed beside the wearable sensing devices.

Another aim is to provide a method of efficiently sensing fast and repetitive input commands in a virtual environment, which are triggered by fast and repetitive contacts of fingers on a surface. It is in particular an aim to provide a method of sensing inputs commands in a virtual environment without false positive input.

According to the invention, these aims are attained by the object of the attached independent claims, and further details in the dependent claims.

With respect to what is known in the art, the invention provides the main advantage that a more reliable and efficient interaction is possible with virtual environments. Other advantages will be provided with the following detailed description.

SHORT DESCRIPTION OF THE DRAWINGS

Exemplar embodiments of the invention are disclosed in the description and illustrated by the following drawings:

FIG. 1: representation of a user wearing the wearable device according to the present disclosure.

Figure 2A:
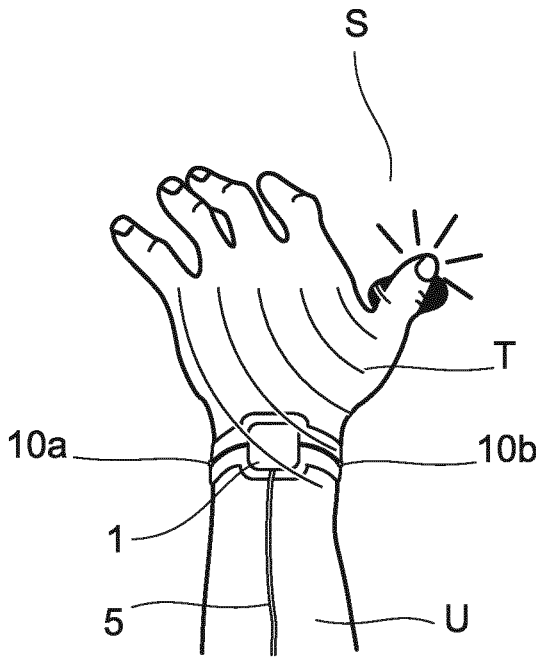
Figure 2B:
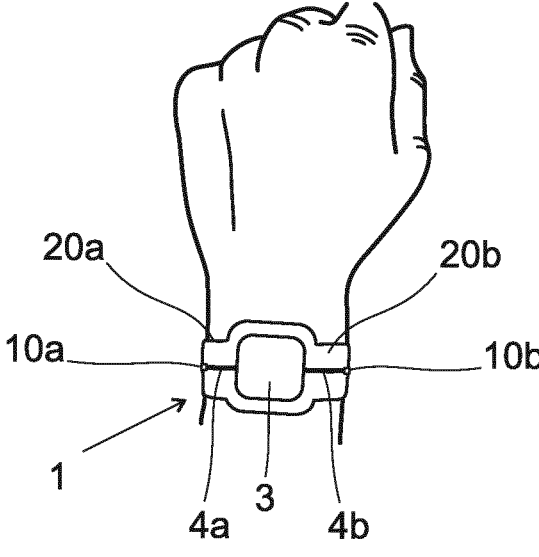
Figure 3:
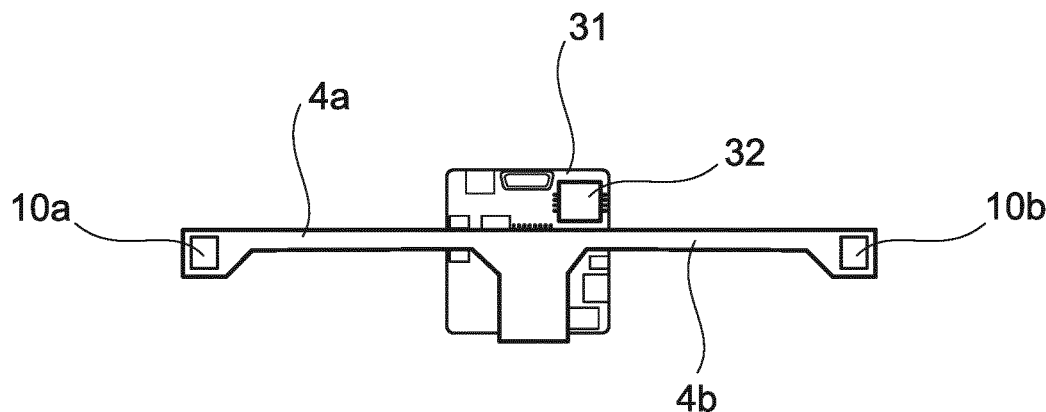

FIGS. 2a, 2b, 3: details of the wearable device according to the present disclosure.

Figure 4A:
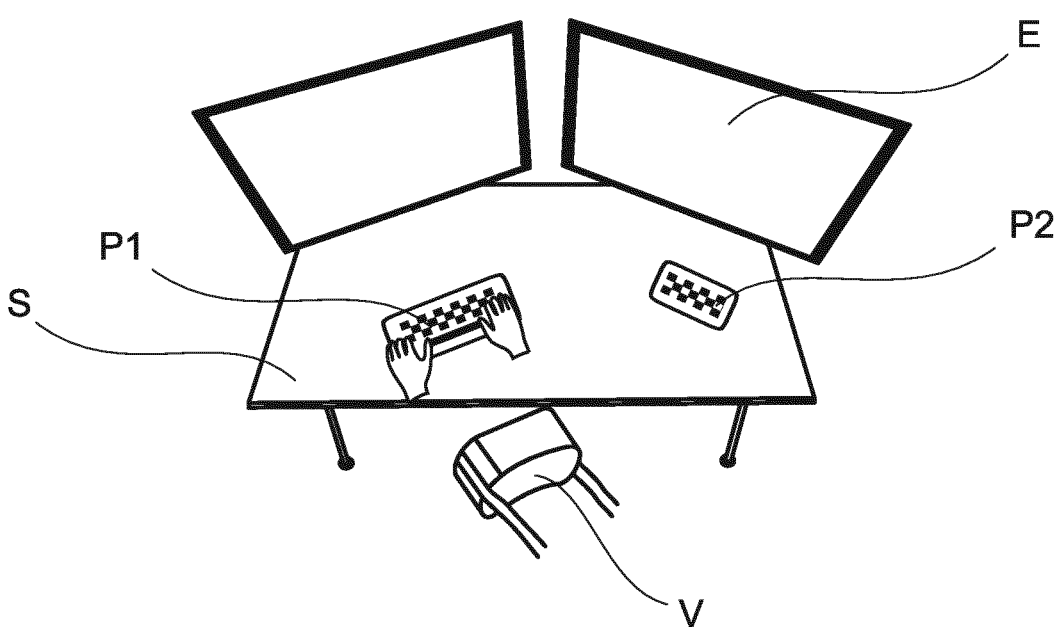
Figure 4B:
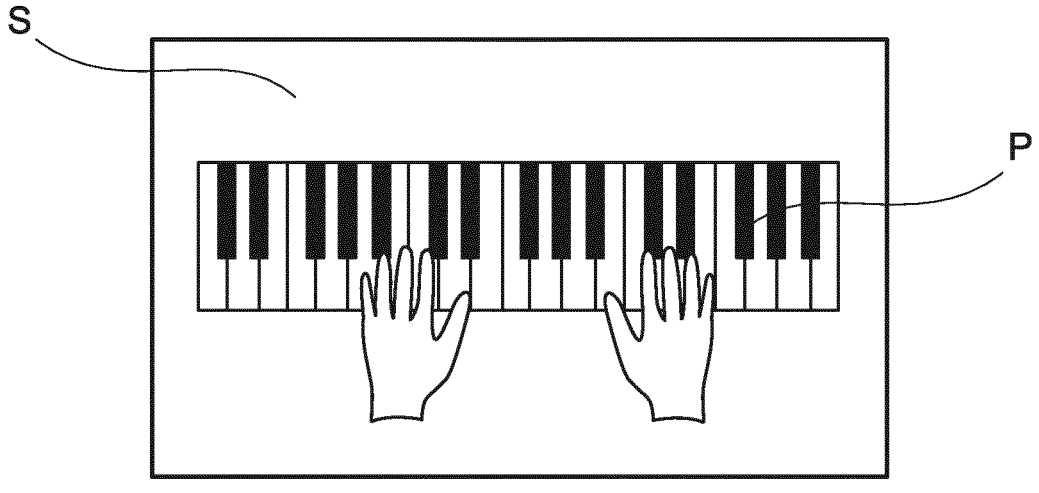
Figure 4C:
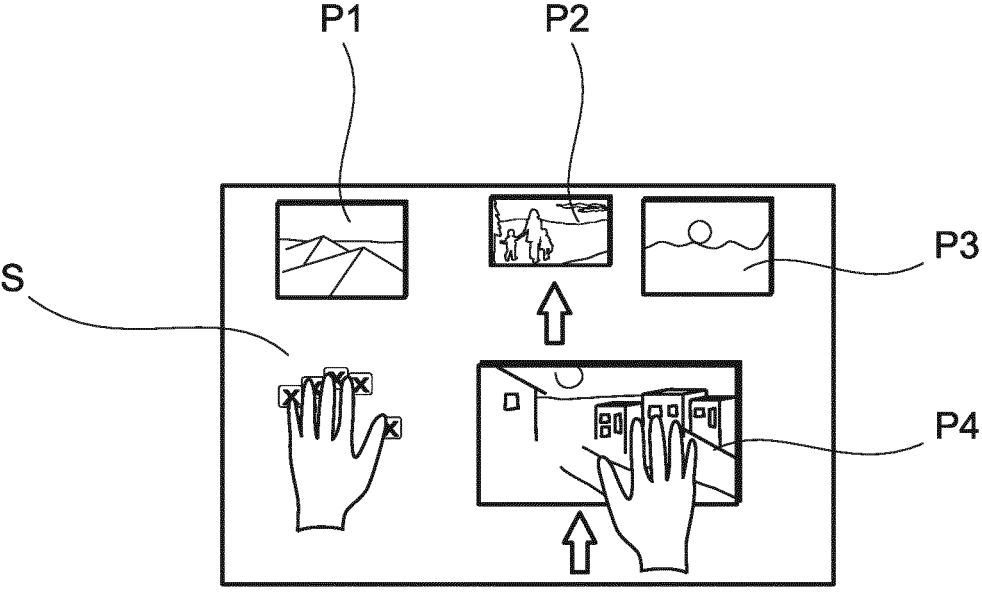

FIGS. 4a, 4b, 4c: representations of examples of applications involving the wearable device according to the present disclosure.

Figures 5, 6:
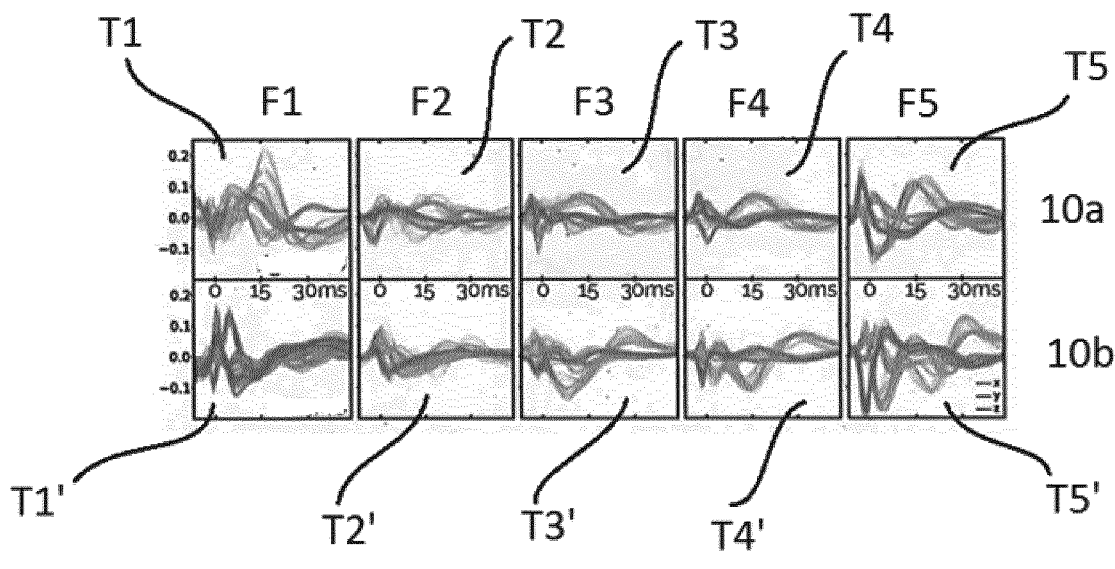

FIG. 5: schematical representation of vibration profiles recorded according to the present disclosure.

FIG. 6: schematical representation of a manufacturing step of the wearable device according to the present disclosure.

EXAMPLES OF EMBODIMENTS OF THE PRESENT INVENTION

With reference to FIG. 1, the present wearable device 1 is worn by a user U. The device 1 is preferably maintained in close contact with the skin of the user U. It is in addition arranged so as to minimize the degree of freedom with regard to the body of the user U. In other words, the device 1 is preferably not free to move independently from the body of the user U. The device 1 may thus be in contact with the skin of the body, while still allowing some minutes arrangements, as common in smartwatches that slightly shift around the wrist, as well as up und down. The user U is close to a surface S, which can be contacted by his fingers F. Such a surface S denotes any real surface, whether it is plane or has a three dimensional shape. It can be of any material such as wood, metal, glass, even covered by textile, coating or any other material. The orientation of the surface S has no importance. It can be horizontal, such a table, or vertical, such as a wall. It is here understood that any usual real object can be considered as a surface S for the purpose of the present disclosure. It is here mentioned that active surfaces, having sensing surfaces such as touch screens, are also usable, providing that the sensing characteristics of such surfaces are excluded from the present disclosure. Thus, the term surface S preferably denotes any passive surface or any passive property of any surface. It is although mentioned that hard surfaces are preferred. Surfaces defined by too soft materials such as foams or flexible material may be less efficient to detect the contact of fingers F. The present invention is however still applicable on such surfaces. Regarding the interaction with soft surfaces, the surface S can also designate the skin of the user himself or another person. Thus, the user can tap his fingers onto his palm instead of an external surface.

The user U may wear a virtual reality equipment V having projection means (not represented) and allowing to create a virtual environment E by means of one or several projected images P, P1, P2, P3, P4 (FIG. 4a, 4b, 4c). Projected images may be seen only by the user or can be seen from any person around him, depending on the type of projection means. For example, virtual glass may be used so that the user is immerged in a virtual environment E. The virtual reality equipment V also designates any augmented reality equipment. It is here understood that any known equipment adapted to create a virtual environment or an augmented environment can be considered for the purpose of the present disclosure. It is however highlighted that the present disclosure presents a clear advantage for wearable virtual reality equipment V, wherein at least all the sensing elements are worn by the user U. The virtual equipment V also comprises one or several optical detection means such as cameras of any kind, adapted to detect and interpret the movements of the user U, and in particular the movements of his fingers involved in the input of commands Referring to FIGS. 4a, 4b, 4c, the virtual reality equipment V creates a virtual environment E, wherein at least some of the projected images P, P1, P2, P3, P4 coincides with a surface S and allow interaction with the user U, through contact with the surface S, triggering an input command. Example of projected images are keyboards allowing text writing (FIG. 4a) or music playing (FIG. 4b). They can be photos or any graphic representations such as technical drawings (FIG. 4c), that can be manipulated. An input command designates the result of the interaction of the user U on the surface S, which may coincides or not with the projected image P, P1, P2, P3, P4. An input command may be limited to an activation of an instruction such as activate a key of a keyboard. It can also be the drag and drop movement allowing to manipulate virtual objects on the surface S. It can also be the selection of a menu in a virtual arborescence. An input command thus requires the contact of at least one finger F of the user with the surface S.

Although the images can be projected on the surface S itself, it is not mandatory. The images defining the virtual environment can be projected on a screen in a way that it coincides with the surface S, from the user point of view. The image projection can thus be on a display such as virtual reality glasses.

The contact of the fingers F coincides with dedicated parts of the projected images P, P1, P2, P3, P4, corresponding to the desired input commands. In addition, some commands can be triggered by contacting one or several fingers F on the surface S outside the dedicated parts of the projected images, or outside the projected images P, P1, P2, P3, P4. For example, a predetermined combination of finger touch on the surface S can be used to open new files or initiate commands which are not directly activable through the projected images P, P1, P2, P3, P4. Such commands can be triggered without being optically sensed by the optical sensing elements of the virtual reality equipment V.

An input command may be triggered by one or several contacts of one or several fingers F of a user U. For example, a double contact of the thumb, or another finger, can be recognized as a specific input command. Alternatively, a concomitant contact of two distinct fingers F, or more than two fingers, or even the full hand, can be recognized as another input command. It is here highlighted that in addition to determining the contact of a finger, as well as the precise time of the contact, the presently described device can also detect and identify the contact of several fingers, or knuckles, or the palm of the hand on the surface, or the contact between the one or several fingers with the palm of the hand. The presently described device can in addition detect and identify larger move such as a swipe gesture, a sliding of one or several fingers or of the full hand or of the arm.

Whether a contact of a finger or several fingers coincides with the projected images P, P1, P2, P3, P4 or not, it is recognized by the wearable device 1, independently from the other sensing devices that the virtual reality equipment V may contain.

Referring to FIGS. 2a and 2b, the wearable device 1 comprises a fixation means 20 adapted to maintain the wearable device 1 onto the body of a user U. The fixation means 20 allows to fix the wearable device 1 at a position remote from the moving parts of the body. In other words, the fixation means 20 does not allow to fix the wearable device 1 directly on the moving parts. The fixation means 20 may thus be adapted to fix the wearable device 1 at the wrist of the user U, while allowing to detect the contact of his fingers on the surface S. According to such an arrangement, the wearable device 1 is not optimal to directly detect the movements of the fingers F, F1, F2, F3, F4, F5, but still allows to identify the contact of the fingers to the surface S. This being said, the wearable device 1 still allows to detect and identify other movements of the fingers and the hand such as sliding moves or clapping of the palm.

The fixation means 20 preferably comprises one or several areas 20a, 20b which are elastic and/or flexible. By this way, the wearable device 1 is maintained in close contact with the body of the user. In addition, the elastic areas 20a, 20b of the fixation means 20 allow to transmit the vibrations T resulting from the impact of the fingers F on the surface S. Depending on the elasticity and/or flexibility of these areas, a damping effect of the vibrations T occurs. Such fixation means may be specifically designed for the present purpose of finger move detection. Alternatively, the fixation means 20 can be an existing fixation means such as a wrist band, a watch band or any equivalent wearable device. The natural flexibility of such devices can advantageously be used for the move detection. One or several move sensors can thus be integrated or combined to existing bands. Alternatively, a rigid wristband can also be used.

The wearable device 1 further comprises at least one move sensor 10, 10a, 10b. As mentioned above, the move sensors are not dedicated to directly determine and characterize the movements of the fingers. They however detect the vibrations T resulting from their contact with the surface S. While a move sensor 10, 10a, 10b can be arranged on a rigid and non-elastic part of the wearable device 1, it is preferably placed on an elastic and/or flexible portion 20a, 20b of the wearable device 1, so as to better sense the vibrations T. Such a move sensor 10a, 10b may be embedded in such elastic or flexible portions 20a, 20b. alternatively, it can be fixed at the surface of such portions, and maintained in contact with the skin of the user U. A move sensor according to the present description can also detect movements other than a simple contact with the surface S, such as sliding movement of the arm, or clapping of the full hands. As we will better see below, a move sensor according to the present description, together with the computing elements of the device, allows to detect a contact of a finger and identify the corresponding finger. It further allows to determine the precise time at which the finger F has contacted the surface S.

A move sensor according to the present disclosure may be specifically designed to detect the finger contact at distance from the finger. It can alternatively be a known move sensor, the data of which is computed in a way to detect and identify a contact of a finger F, while being remotely arranged. For example, a move sensor already present in another existing device such as a watch, a smartwatch or any wearable device, can be connected to the present device or to the computing means of the present device, so as to determine the move of the fingers F and the hand of a user, as described her. The vibrations T resulting from the contact of the fingers F with the surface S are of mechanical nature. Other wave type such as sound waves are significantly less efficient on the move sensors. It is thus understood that a wave triggered by a touch propagates through the body and is then detected by the move sensors 10a, 10b. The dumping effect of the elastic portion 20a, 20b rapidly decreases the amplitude of the mechanical vibrations T, while allowing their characterisation by the move sensors 10, 10a, 10b. This allows to detect and characterize a rapid succession of several finger contacts. For examples, a number of more than 5 fingers contacts per second, or more than 10 contacts per second or even more can be detected, identified and characterized by the move sensors 10a, 10b and the computing means of the device 1 using the present method The move sensor 10a, 10b is preferably of inertial type, such as accelerometer. Other suitable types of move sensors can be used.

The move sensors 10a, 10b are preferably adapted to detect high frequency movements. Alternatively or in addition, the wearable device 1 is adapted to record and treat only signals resulting from vibrations T, excluding the signals resulting from ample moves. Alternatively or in addition, the wearable device 1 is adapted to provide a specific weight according to the type of move, so as to privilege the consideration of high frequency moves compared to the low frequency moves. Alternatively or in addition, a detected move may be further amplified or reduced according to its frequency. Some or all high frequency components of a signal may be combined to some or all lower frequency components resulting from the movement of the hand during the tap as well, for an improved contact classification. Signals that are caused by larger movements of the hand or the arm, such as swiping movements, can be detected and recognized as supporting control gestures. A threshold in magnitude may be predetermined to select the signals to be treated. Alternatively or in addition, a rate of change RC of the row signal is determined. To this end, the rate of change RS of all the axes of a given move sensor 10a, 10b is determined and computed to provide a rate of change score RCS. Computing parameters may be included in the determination of the rate change score RCS. For example, an exponential decrease may be considered to identify and analyse only the fast changes.

The exact time of a tap event, corresponding to the contact of a finger on the surface S, may be determined according to the following formula (1):

$$RCS_t = (RCS_{t-1}/1.6) + \Sigma_{(sensors)}\Sigma_{(axes)}|RS_t - RS_{t-1}| \tag{1}$$

Wherein:

$RCS_t$ denotes the rate change score at a given time t, $RCS_{t-1}$ denotes the rate change score at a preceding time t-1, $\Sigma_{(sensors)}\Sigma_{(axes)}|RS_t - RS_{t-1}|$ denotes the differences of the rate of change RS for each axis of each sensor between the given time t and the preceding time t-1.

In the above formula (1) the sampling time is preferably selected in a way to avoid that a single touch triggers several consecutive inputs. The sampling window may be for example between around 100 ms and around 300 ms. A window of 150 ms, 200 ms or 250 ms may thus be adapted to differentiate the signals of distinct finger contacts on the surface S. The time sampling is preferably determined to allow the detection of at least 500, or at least 600, or even more, inputs per minutes.

The signals can be computed according to the above formula (1) or according to any other suitable algorithm in the computing unit 31. The computing unit 31 can in addition synchronise the signals received from several move sensors 10a, 10b so as to accurately characterize a sensed impact of a finger F.

The detection of a tap can be based on an RCS threshold, as above explained. Alternatively, the detection and characterization of a contact can be purely machine learning based. A neural network receives the captured frames of a sliding window on the accelerometer data as input and predicts whether a tap was present and from which finger it resulted.

While only one move sensor may be used, the present wearable device 1 preferably comprises 2 moves sensors 10a, 10b or more. More preferably, each of the move sensors is placed within an elastic or flexible portion 20a, 20b of the fixation means 20. The position of each move sensor 10a, 10b may also be determined to optimise the vibration detection and characterization. According to a preferred configuration, when the wearable device 1 comprises two move sensors 10a, 10b, they are arranged on the fixation means 20 so as to be as distant as possible from each other, once the wearable device 1 is worn by the user U. This allows to increase the difference between the vibration profiles recorded by each of the move sensors 10a, 10b, and increases the accuracy of the vibration characterization. Alternatively or in addition, move sensors 10a, 10b may be localised close to the bones, through which the vibration waves are transmitted. On the contrary, it can be determined that they are placed in contact of soft tissues, wherein the vibration waves can take more differentiate profiles. In case the wearable device 1 comprises 2 or more move sensors 10a, 10b, one can be arranged close to a bone and the other one can be arranged in contact to soft tissues, so as to be able to record more variety of data.

Any kind of suitable move sensors 10a, 10b may be used. For example, a low-cost LIS2DH accelerometer, or a low-noise ADXL355, Analog Device can be used.

Additional move sensor may be incorporated to the wearable device 1, in particular to rigid and non-elastic portions. It is however preferable that at least one of the move sensors 10a, 10b comprised in the wearable device 1 is combined to soft material, elastic and/or flexible.

The elastic or flexible portions 20a, 20b may be made or comprise soft polymers such as silicon, rubber, or any related polymers. The fixation means 20 may be integrally made of one or several of these polymers. Alternatively, the fixation means 20 may be non-elastic and comprise one or several distinct elastic portions 20a, 20b. The fixation means 20 may form a strip or a band or a wristlet or any suitable shape adapted to the present disclosure. The elastic or flexible portions 20a, 20b may be integrated to an existing device so as to form a fixation means 20, comprising at least one of these elastic or flexible portions 20a, 20b.

The wearable device 1 comprises some electronic means allowing to compute the vibrations T sensed by the move sensors 10a, 10b. It comprises for example a computing unit 32, receiving the vibrations T sensed by at least one move sensor 10a, 10b. Adequate sensor connexion means 4a, 4b allow to transmit the data from the move sensor 10a, 10b to the computing unit 32.

The computing unit 32 can be integrated to the wearable device 1 or being remotely connected to it. It is adapted to identify and characterize a tap based on the data received from one or several of the move sensors. A tap is understood as designing any contact move of one or several of the user's fingers on or against a surface 5, either alone or combined with other moves such as a hand movement or an arm movement. According to an embodiment, the device 1 comprise a memory 31, comprising reference data allowing the computing unit analysing the sensed vibrations T. Reference data includes for example the typical vibration profiles T1, T2, T3, T4, T5 previously recorded by one or several move sensors 10a, 10b. Referring to FIG. 5, an example of vibration profiles is provided, corresponding to the cumulated vibration profiles related to the contact of each fingers F1, F2, F3, F4, F5 on a surface 5, recorded by a specific move sensor 10a, 10b. Depending on the finger F1, F2, F3, F4, F5 which contacts the surface S and to the position and/or the characteristics of the move sensors 10a, 10b, slight differences can be identified in the corresponding vibration profiles. The memory 31 may thus comprise one or several libraries of reference profiles. For example, vibration profiles T can be classified according to predetermined width or circumference of wrists. Alternatively or in addition, the vibration profiles T may be classified according to predetermined values of the strength of the fingers contact on the surface S. Any other suitable arrangement of the reference data in the memory 31 can be envisaged. A reference vibration profile is preferably based on more than 1 record, more than 10 records, more preferably more than hundreds records. When receiving sensed vibrations from a move sensor 10a, 10b, the computing unit 32 is able to compare the sensed vibrations to the reference data stored in the memory 31 and to determine which finger F is concerned. For example, the computing unit 31 can evaluate the probability that a sensed vibration corresponds to a given reference profile T1, T2, T3, T4, T5. When several move sensors 10a, 10b are used, the sensed vibration of each of these move sensors can be compared to corresponding reference profiles, thus increasing the accuracy of the determination.

Alternatively or in addition, the memory 32 may comprise weights to be applied by the computations for the data received form the move sensors. For example, weight related to a frequency range or damping signal or any other necessary parameters of the received signals may be stored in the memory 31.

According to another embodiment, the computing unit 32 of the present device 1 does not use reference profiles stored in the memory to determine a given tap. According to such an arrangement, the reference profiles are stored in the memory only for calibration purpose or for learning purpose, or for any pre-setting operation. The computing unit 32 then only considers some parameters stored in the memory 31, such as weights of the signals to be considered.

The memory 32, the computing unit 31, or both, can comprise or be connected to a neural network allowing to accurately compare the sensed vibrations T to reference profiles. Such comparison may occur as a learning step only, while being no longer used for the signal characterization. On the contrary, some or all reference profiles may be used for the characterization of the signals. Alternatively or in addition, the signal which are detected and recognized as command signals may be stored in the memory 31 and used later as reference profiles, either automatically or after another selection. Any suitable neural network can be implemented. For example, a multi-layer feed-forward ID-convolution neural network following a VGG-style architecture can be used for the present purpose. Profiles of one hand can be recorded and then mirror imaged to provide reference profiles related to the other hand. Alternatively, the reference profiles are independently recorded for the two hands. A training step is implemented according to suitable algorithms. For example, the identification of a finger F can result from a training using the Adam optimization algorithm and a suitable loss function such as a cross-entropy loss for classification. Other suitable algorithms may be used either as alternatives or as complementary computing method.

Although the computing unit 31 and the memory 32 are described above as being embedded within the wearable device 1, alternative arrangements can be envisaged. For example, one of the computing unit 31 and the memory 32 can be arranged remote the wearable device 1 and connected to the move sensors 10a, 10b by a suitable connexion means. Such a suitable connexion means can be of wireless type or comprise a wire. Suitable communication means may be embedded in the wearable device 1. It is here highlighted that fast exchanges should still be possible between the detected signal at one or more of the move sensors 10a, 10b and the computing unit 31 and/or the memory 32. The signal should indeed be detected and treated at a rate which is compatible with the frequency of the contacts of the fingers F on the surface S.

The wearable device 1 may further comprise a connexion means 5 adapted to transmit to a remote device at least one of the sensed vibrations T and the profile identification of a sensed vibration T. Here, the sensed vibrations T denotes the crude signal transmitted from at least one move sensor 10a, 10b. The profile identification comprises the determination of the finger F, responsible of a sensed contact on the surface, as well as its precise time. The remote device can be a computer. Alternatively, the remote device can be a worn equipment such as the virtual reality equipment V. The connexion means 5 thus allows to combine the sensed or computed data originating from the wearable device 1 to other data recorded by the virtual reality equipment V. The computing means already embedded in the virtual reality equipment V can compare, or fuse or compute the signals received from the wearable device 1 and those received from the other sensing means of the virtual reality equipment V so as to consolidate a detected input from the user U. The communication means 5 can be wired or wireless.

For example, each input detected through an optical detection means of the virtual reality equipment V, can be subject to a confirmation by receiving the appropriate finger contact on the surface S. The input may be triggered only after such a confirmation, so that false negative are avoided. The confirmation includes here the proper identification of the finger F responsible of the input. Of course, any other suitable approaches to computes the different signals can be envisaged according to the specific needs.

The wearable device 1 may further comprise a board, maintained by the fixation means 20 or integrated to another wearable device such as a watch or a smartwatch. The board may define a space wherein one or several of one or more move sensors, the computing unit 32, the memory 31 and the connection means 5 are localized. The board may in addition comprise a display visible from the user U, adapted to provide information to him. It may in addition comprise input commands such as buttons or tactile areas adapted to input settings onto the device 1. The board may in addition comprise other functionalities which are not related to the finger contact detection.

The wearable device 1 can be presented as a single distinct object that the user U can put on his body, like at his wrist. Several identical wearable devices 1 can be worn, for example, one at each wrist. Alternatively, one or more of the elements such as move sensors 10a, 10b, computing unit 31, memory 32 and any corresponding connexion means can be integrated or combined to worn device, such as a watch or a wristband. Some or all of the functionalities of the computing unit 32 can be implemented to an existing computing unit of a worn device.

The present disclosure also comprises a virtual reality equipment V comprising or connected to a wearable device 1 as here described. Such a virtual reality equipment is in particularly full worn. It comprises a central computing unit allowing to combine the data provided by the wearable device 1 and the other sensing elements such as cameras.

The present disclosure also comprises a method of sensing an input command on a surface S in a virtual environment E. The method according to the present disclosure comprises a detection step a) of detecting the contact of at least one finger F of the user U on a surface S. The detection step is preferably done by means of at least one move detector 10a, 10b arranged on the body of the user U remote to the moved fingers F. The contact detection can be advantageously done by means of the wearable device 1. A contact profile recording the profile of the vibrations T resulting from the contact of the at least one finger F on the surface S is collected and stored.

Through the present description, the data received by the computing unit may originate from any one of the user's hand. The right and/or the left hand of a user may be used as a training hand or to provide reference profiles. The device 1 can then be adapted to any one of the user's wrist, independently on the hand of origin of the stored data. A specific parameter can be included in the stored data to automatically convert signals from one hand to another one. In addition, the stored data can originate from a distinct user. In other word, the data used in the present method to determine a tap operated by a given user, upon sensed moves, can originate from one or several distinct other users.

The method further comprises a classification step b) wherein the sensed contact of a finger, detected in step a), is compared to at least one library comprising profiles of reference T1, T2, T3, T4, T5, T1', T2', T3', T4', T5' stored in a memory 31. Each of the vibration reference profile corresponds to a cumulative records of vibrations T resulting from the contact of predetermined fingers F on a surface S. The classification step b) allows to determine which is the finger F responsible for the sensed vibration profile, based on the result of the comparison with the reference profiles. Such a determination may be based on statistical analysis. It can also involve a neuronal network, as described above. A finger F is then identified as being the origin of the sensed vibration T, as well as the precise time of its contact. The classification step is preferably performed by means of the wearable device 1 described above. The classification step b), in addition to identify a finger F involved in the contact with a surface S, can also identify a combination of two or more fingers concomitantly contacting the surface S. The classification step b) can in addition or alternatively identify a multi-contact of a given finger F such as a double contact.

The method according to the present disclosure can further comprise a consolidation step c) wherein the results of the preceding detection steps a) and classification b) are combined or compared or fused to the results of sensing operations using other distinct sensing devices. In particular, such other distinct sensing devices can be cameras or other visual systems involved in the detection of the same movements. The other sensing devices are for example those of a virtual reality equipment V, in particular worn sensing devices of a virtual reality equipment V. The consolidation step c) is particularly advantageous for identifying movements dedicated to input commands in interaction with a projected image P on a surface S. The consolidation step c) thus allows to confirm or not the optical detection of the input command. The consolidation step c) may however be optional for input command which are not in interaction with a projected image P, and/or not under visual control.

The method according to present disclosure comprises a decision step d) based on the results of the preceding detection step a) and classification step b), potentially including the consolidation step c). For an input command not in interaction with a projected image P, or not under visual control, the decision step d) only refers to the results of the detection step a) and classification step b). Such a decision step d) is for example to trigger an input command if a multi-contact or a combination of several concomitant contacts of the suitable fingers F is detected is step a) and properly classified in the classification step b). For an input command in interaction with a projected image P and under visual control, the consolidation step d) includes determining whether an input command detected by the other sensing device is also detected and properly classified according to the detection step a) and classification step b). If yes, the input command is accepted and the corresponding command is triggered. If not, the input command is not accepted and the corresponding command is not triggered.

The present disclosure further comprises a manufacturing process allowing to produce a wearable device 1 or parts of a wearable device 1, as above described. With reference to FIG. 6, the manufacturing process comprises the step of providing a mould M comprising at least one area 33a, 33b, adapted to receive a fluid soft polymer. It further comprises the step of placing at least one move sensor 10a, 10b in one of the at least one areas 33a, 33b together with the corresponding sensor connexion means 4a, 4b. It further comprises the step of maintaining, at least temporarily the move sensors 10a, 10b at a predetermined position, by means of temporary fixation means 6, 6a, 6b. The manufacturing process further comprises the step of pouring a fluid soft polymer at least in the corresponding areas 33a, 33b, so as to embed or recover the move sensors 10a, 10b. The manufacturing process comprises the additional step of curing the soft polymer so that it conserves its own shape once extracted from the mould M. Such a curing step may be done under thermal conditions or under light irradiation, depending on the polymer, under conditions appropriate to not damage the components of the wearable device 1. Following this manufacturing process, at least one move sensor 10a, 10b is permanently combined or embedded in an elastic and/or flexible material adapted to damp vibrations T. Said areas 33a, 33b may be localised at any suitable place, such as on lateral branches of a wristband or on a central board of the device 1.

The mould M may be designed so as to encompass all or most of the components of the wearable device 1, such as the memory 31, the computing unit 32, and the related connexion means. To this end, it may comprise an area 3 dedicated to receive these elements. Alternatively, these elements are not embedded in the soft polymer and connected afterwards to the move sensors 10a, 10b by means of the free end of the connexion means 4a, 4b. Following this partial encapsulation, the wearable device 1 can be combined or integrated to other wearable devices.

The mould M may be prepared according to any known technic. A convenient way is the use of additive manufacturing, also known as 3D-printing process.

Example

According to an example, a wearable device 1 has been manufactured as above described using Shore 32 TFC elastic silicon (TFC Troll-factory Two-component Silicon Type as a fixation means.

All the components including 2 move sensors 10a, 10b, memory 31 and computing unit 32, are embedded in the soft polymer.

The two move sensors are ultra-low-power accelerometers LIS2DH, ST Microelectronics. They are running at a sampling frequency of 1344 Hz and store data in a FIFO. They are arranged so as to be opposite one to each other once the wearable device is placed on the wrist of a user U.

The computing unit 32 is of type of System-on-Chip, DA 14695, (Dialog Semiconductor).

The classification involves neural network having 5 blocks of convolutional layers and two final linear layers that feed into a softmax activation function.

A panel of 4 participants was enrolled to provide 3600 tap events. The detection of the tap event was performed according to formula (1) above and achieved an accuracy of 0.996.

A cross-validation with a panel of 18 participants achieved an accuracy of 0.93 with a standard deviation of 0.06.

When testing on each participant and training on all other participants, the Macro-average F1 score is 0.87.

REFERENCE SYMBOLS IN THE FIGURES

1 Wearable device
10, 10a, 10b Move sensors
20 Fixation means
20a, 20b Elastic parts
3 Computing unit area
31 Memory
32 Computing unit
4a, 4b Sensor connexion means
5 Connexion means
6, 6a, 6b Temporary fixation means
F, F1, F2, F3, F4, F5 Fingers
M Mould
P, P1, P2, P3, P4 Projected images
S Surface
T1, T1' vibrations profiles
V Virtual reality equipment
U User

The invention claimed is:

1. A wearable device adapted to detect contacts of at least one finger of a user on a surface, comprising:
    a fixation means adapted to maintain the wearable device remote to the at least one finger of a user and to transmit a vibration resulting from the impact of the fingers on the surface,
    at least one move sensor, adapted to detect the vibrations resulting from the contact of the at least one finger of the user with the surface, while being remotely arranged at distance from the finger
    a memory, a computing unit, which is connected to the at least one move sensor, wherein the computing unit is configured to identify the finger or the fingers responsible for the vibrations sensed by the at least one move sensor.

2. The wearable device according to claim 1, wherein the computing unit is further configured to compute characteristics of movements of a hand and/or an arm of a user, and to combine them to sensed data used to identify a finger or fingers responsible for the impact.

3. The wearable device according to claim 1, wherein the computing unit is configured to compute mechanical vibrations and/or fast moves and to exclude or filter some or all of ample and/or slow moves.

4. The wearable device according to claim 1, wherein said memory comprises the vibration profiles resulting from the impact of one, several or each of the five fingers of a hand of the user on a surface, said profiles being used as training data and/or as reference data for the identification of the fingers impacts.

5. The wearable device according to claim 1, wherein said memory comprises weight to be considered according to a frequency of sensed moves.

6. The wearable device according to claim 1, wherein said fixation means comprises at least one flexible and elastic portion, and wherein said at least one move sensor is embedded or combined to said at least one flexible and elastic portion.

7. The wearable device according to claim 1, wherein the device comprises two move sensors or more, embedded or combined to distinct flexible and elastic portions of the fixation means, and arranged so that one of said move sensor is opposite to the other move sensor once the wearable device is worn by a user.

8. The wearable device according to claim 1, wherein said fixation means denotes a wristband or a watchband, so that said at least one move sensor can be integrated or combined to said wristband or a watchband.

9. The wearable device according to claim 1, further comprising a board, which is maintained on the user by means of said fixation means, and wherein one of said at least one move sensor is localised.

10. The wearable device according to claim 9, wherein at least one vibration profile results from several records of vibrations triggered by the contact of the corresponding finger of any one of the user's hand on a surface.

11. A virtual reality equipment comprising a wearable projection means adapted to provide a virtual environment comprising projected images, wherein at least one of the projected images can serve as an input command interface, a wearable optical detection means configured to identify movements of the fingers of a user on a surface in interaction with said projected image serving as input command interface, and at least one wearable device according to claim 1.

12. The virtual reality equipment according to claim 11, wherein said virtual reality equipment and said wearable device are connected and configured to fuse or compare the movements of the fingers of the user simultaneously recorded by said wearable device and said virtual reality equipment.

13. A method of sensing an input command on a surface in a virtual environment comprising a detection of a contact of at least one finger of the user on said surface and identifying a corresponding finger, using the wearable device described in claim 1.

14. The method according to claim 13, further comprising comparing or combining the result of contact detection with a concomitant result of an optical sensing device and determine whether the contact of said at least one finger corresponds to an input command or not.

15. A manufacturing process for producing a wearable device according to claim 1, comprising a step of placing at least one move sensor and the corresponding connection means, into a mould, a step of spreading a fluid soft polymer in the mould so as to embed the at least one move sensor, and a step of curing the soft polymer.

* * * * *